(12) United States Patent
Zheng et al.

(10) Patent No.: US 7,594,941 B2
(45) Date of Patent: Sep. 29, 2009

(54) ROTARY GAS CYCLONE SEPARATOR

(75) Inventors: Ying Zheng, New Maryland (CA); Jinyu Jiao, Fredericton (CA); Qikai Zhang, New Maryland (CA); Guogang Sun, Beijing (CN)

(73) Assignee: University of New Brunswick, Fredricton (CA)

( * ) Notice: Subject to any disclaimer, the term of this patent is extended or adjusted under 35 U.S.C. 154(b) by 575 days.

(21) Appl. No.: 11/508,327

(22) Filed: Aug. 23, 2006

(65) Prior Publication Data

US 2008/0047239 A1 Feb. 28, 2008

(51) Int. Cl.
B01D 45/12 (2006.01)
B01D 50/00 (2006.01)

(52) U.S. Cl. .............. 55/299; 55/300; 55/304; 55/337; 55/459.1; 55/477

(58) Field of Classification Search ............ 55/291, 55/296, 299, 300, 302, 304, 337, 459.1, 477
See application file for complete search history.

(56) References Cited

U.S. PATENT DOCUMENTS

| | | | | |
|---|---|---|---|---|
| 409,025 A * | 8/1889 | Downton | .................. | 55/296 |
| 3,979,194 A | 9/1976 | Wiser | .................. | 55/296 |
| 5,271,751 A | 12/1993 | Lagler | .................. | 55/293 |
| 5,922,092 A | 7/1999 | Taylor | .................. | 55/295 |
| 6,090,183 A | 7/2000 | Awaji | .................. | 95/35 |
| 6,824,580 B2 | 11/2004 | Oh | .................. | 55/295 |
| 6,928,692 B2 | 8/2005 | Oh et al. | .................. | 15/352 |
| 2001/0025395 A1 | 10/2001 | Matsumoto et al | .......... | 15/353 |
| 2004/0177471 A1 | 9/2004 | Jung et al. | .................. | 15/352 |
| 2004/0187253 A1 | 9/2004 | Jin et al. | .................. | 15/352 |
| 2004/0200029 A1 | 10/2004 | Jin et al | .................. | 15/352 |
| 2006/0042202 A1 | 3/2006 | Lee et al. | .................. | 55/289 |

FOREIGN PATENT DOCUMENTS

| | | |
|---|---|---|
| JP | 2003038397 | 2/2003 |
| JP | 2003038398 | 2/2003 |
| JP | 2003310507 | 11/2003 |
| JP | 2004249068 | 9/2004 |

OTHER PUBLICATIONS

Investigations concerning the separation mechanism in deflector wheel classifiers, Bauder et al, International Journal of Mineral Processing, 74S (2004 pp. S147-S154.
Particle collection efficiency of the rotational particle separator, Brouwers, Powder Technology, 92 (I997) pp. 89-99.
Method of calculation of new cyclone-type separator with swirling baffle and bottom take off of clean gas-part I: theoretical approach, Chmielniak et al, Chemicla Engineering and Processing 441 (2000) pp. 441-448.

* cited by examiner

*Primary Examiner*—Robert A Hopkins
(74) *Attorney, Agent, or Firm*—Lynn C. Schumacher; Hill & Schumacher

(57) ABSTRACT

The present invention provides a device for removing particulate matter from an air stream, and more particularly the present invention relates to a rotary gas cyclone separator with a dual-ducted filtering vortex finder for separating fine particles as small as 1 μm from an air stream.

19 Claims, 5 Drawing Sheets

A-A

ROTARY GAS CYCLONE SEPARATOR

FIELD OF THE INVENTION

The present invention generally relates to a device for removing particulate matter from an air stream, and more particularly the present invention relates to a rotary gas cyclone separator with a dual-ducted filtering vortex finder for separating fine particles as small as 1 µm from an air stream.

BACKGROUND OF THE INVENTION

Many industrial processes, such as mineral processing, petroleum refining, chemical engineering, food processing, and environmental cleaning, require the removal of particulate matter from an air stream. The present invention relates to gas cyclone separators for separating particulate material from a gaseous medium. Cyclone separator is widely used for its main advantages of simple structure and low cost. A common type of cyclones is the so-called "reverse flow" cyclones where particle-rich gas can be withdrawn from the tangential inlet of the cyclone body, while clean gas essentially reverses flow from its initial path toward the end of the cyclone body, back toward the vortex finder (the gas outlet). The gas outlet is a tube normally located within the cyclone body. In this type of cyclone, particles are separated based on the balance between inertial and fluid forces acting on the particles in a flow field.

Therefore, this type of cyclone generally has low separation efficiency for fine particle or particles whose density differs very little from the density of the fluid. The present invention provides a cyclonic separator with improved efficiency for removal of fine and light particles from air streams.

JP02003038398A discloses a cyclone type vacuum cleaner. Dust is separated through two filters: a cylindrical filter and a filter bag. A rotary brush is arranged at the outer surface of the cylindrical filter, which is different from the present invention. The cylindrical filter is closed and air can only flow through the outer side surface of the cylindrical filter into the center of the cylindrical filter and then goes to the filter bag. The direction of the air stream flowing through the cylindrical filter is opposite to the design of the present invention.

JP02004249068A discloses a cyclone dust collecting device of a vacuum cleaner. The cyclone is in a cylindrical shape, which is different from the present design where the cyclone comprises an upper cylindrical part and a lower conical part. The direction of air flowing through the rotating filter which is in the center of the cyclone body is opposite to the cyclone described herein. Further, there is no brush used in the cyclone dust collecting device.

JP 2003310507 discloses a dust collector and a vacuum cleaner. A cyclone type box is inserted and located in a cleaner main body. The cyclone type box is not present as a combination of a cylindrical and a conical part. There is no double vortex formed within the box.

JP2003038397 discloses a cyclone type dust collector having a filter brushing mechanism. This cyclone type dust collector has no conical part. The rotating brush is to clean the outer surface of the filter.

U.S. Pat. No. 6,824,580 B2 discloses a cyclone dust collecting apparatus for a vacuum cleaner including a cyclone body, a flexible dust receptacle (or bag), a grill assembly and a contaminant removing unit. The spiraling air is formed within the flexible dust receptacle rather than in the cyclone body. The grill assembly includes longitudinal slots which are used to filter out containments and the contaminant removing member moves up and down.

U.S. Pat. No. 6,928,692 B2 is similar to U.S. Pat. No. 6,824,580 B2 but makes a major modification to the grill assembly. A rotating brush is arranged outside the grill assembly.

U.S. Pat. No. 3,979,194 discloses a cylindrical dust filter for placement on the exhaust cylinder of a dust collector. This device collects dust without the use of centrifugal forces and is placed on the gas exit of a dust collector.

United States Patent Publication No. 20040200029 discloses a filter assembly for a cyclone-type dust collecting apparatus of a vacuum cleaner which filters the dust included in the air current discharged from the outlet port of the cyclone-type dust collecting apparatus. Concerning the cyclone-type dust collecting apparatus, the cyclone body does not include an upper cylindrical part and a lower conical part. This filter assembly does not use centrifugal forces to separate particles. Within the filter assembly, a brush is placed to brush the outer surface of the filter and the filter is rotary, which are different from the present invention, in which the brush is arranged to brush the inner surface of the filter and the filter is not rotary. The filter is in a wave shape in the present invention.

United States Patent Publication No. 20040187253 discloses a filter cleaning device which comprises a cyclone body, a dust collecting receptacle and a filter. This filter cleaning device is similar to the disclosures of U.S. Pat. No. 6,928,692 B2 and U.S. Pat. No. 6,824,580 B2 except for the filter. The brush is placed to brush the outer surface of the filter and moves up and down.

United States Patent Publication No. 20040177471 A1 discloses a similar design to the disclosures of US20040187253, U.S. Pat. No. 6,928,692 B2 and U.S. Pat. No. 6,824,580 B2 except the filter assembly. Again, brush is placed outside of the filter and moves up and down.

United States Patent Publication No. 20060042202 discloses a dust collection unit for a vacuum cleaner. This unit consists of a cylindrical part only without the conical part. The direction of air flowing through the filter is opposite to the present design. The brush is positioned in such a way as to brush the outer surface of the filter and the arrangement of brush is different from the device disclosed herein.

U.S. Pat. No. 5,271,751 discloses a device for removing dust from a work processing machine and more particularly from a floor sanding machine. The dust separator is preferably in the form of a centrifugal separator. The gas outlet of this dust separator is a simple cylinder. In the present design, the gas outlet (which is called vortex finder in this invention) was replaced by a dual-layer filter and a rotary brush.

U.S. Pat. No. 6,090,183 discloses a method for processing an exhaust gas produced during manufacturing of semiconductor devices. In this invention, a rotating brush is used to remove the fine particles accumulated on the wall of the processing chamber. There is no gas cyclone or filter disclosed in this patent.

U.S. Pat. No. 5,922,092 discloses a system for gasification of a wide range of solid organic materials to yield a useful product gas output. In the mechanical cleaner, gas stream is introduced to the bottom and exits at the top of the cleaner. Further, the conical part is placed above the cylindrical part. There is no double vortex flow pattern in the cleaner.

United States Patent Publication No. 20010025395 discloses an electric vacuum cleaner. In this disclosure, the dust collection chamber is cylindrical and there is no double vortex flow pattern for air stream. The brush is placed at the outer surface of the filter.

JP8182910 discloses a dust removal device for removal of oil content and water content from gas, which contains a cylindrical housing, a liquid separating device, a filter and a rotary brush.

U.S. Pat. No. 5,746,795 discloses a cyclonic air cleaning device, which includes a cylindrical-conical cyclone body, a barrel having a vortex tube concentrically positioned in the top cylindrical section and a cylindrical, pleated filter cartridge concentrically positioned within the vortex tube. This design does not contain a rotary brush, different from the present invention. The rotary brush in the present design can improve the separation efficiency of the cyclone separator and prevent particles from accumulating on the surface of the filter.

U.S. Pat. No. 6,739,456 discloses a particle classifier, comprising a housing, a boundary layer momentum transfer device, and an inlet flow control mechanism, for the classification of particles from a fluid stream via centrifugal separation imparted by boundary layers developed between rotating parallel disks. The rotational disks are stacked in spaced, parallel relation in the interior chamber. However, short circuit of gas flow may occur at the openings of the stacked disks.

The publication, Tomasz Chmielniak, Andrzej Bryczkowski, Method of calculation of new cyclone-type separator with swirling baffle and bottom take-off of clean gas—part I: theoretical approach, Chem. Eng. Process. 39 (2000) 441-448, teaches a cyclone-type separator with swirling baffle and bottom take-off of clean gas for separating solid particles from gases. The principal part of the cyclone-type separator is the cylinder-shape baffle with flow gaps cut on its surface, and the baffle is driven to rotate at different speeds by the motor placed on the top of the separator. When the dusty gas flows into the separator tangentially, most of the solid particles will be stopped by the swirling baffle while the clean gas passes through the flow gaps and flow out of the separator from the bottom.

The publication A. Bauder, F. Müller, R. Polke, Investigations concerning the separation mechanism in deflector wheel classifiers, Int. J. Miner. Process. 74s (2004) s147-s154, teaches a classifier with a rotating deflector wheel located inside. The feed material is transported by the gas to the deflector wheel with the rotating tip speeds up to 60 m/s for fine cut sizes. Because the influence of the centrifugal force is stronger than the drag force for the coarse particles, the coarse particles are rejected by the classifier wheel and sediment to the coarse outlet. However, for the fines, they leave the classifier with the gas stream through the deflector wheel because the influence of the drag force is dominant.

The publication J. J. H. Brouwers, Particle collection efficiency of the rotational particle separator. *Powder Technol.*, 92 (1997) 89-99, teaches a rotational particle separator for separating solid and/or liquid particles from gases. The key component is the rotating filter element which consists of a multitude of axially oriented channels located in the cyclone body. Particles in the gas passing through the channels in a laminar fashion are centrifuged towards the outer collecting walls of each channel, and the clean gas leaves the channels at the exit.

SUMMARY OF THE INVENTION

The present invention addresses the need for a device for removing particulate matter from gas streams in different industrial processes, and particularly for a device for separating fine particles as small as 1 µm from a gas stream.

Thus, the present invention provides a rotary cyclone apparatus for separating particles from a gas stream, comprising:

a) a cylindrical-conical type cyclone body having a rigid lower conically shaped section and a rigid upper cylindrically shaped section with a tangential inlet, said cylindrical-conical type cyclone body including a central axis;

b) a dust hopper attached to a bottom of the rigid lower conically shaped section;

c) a gas outlet attached to a top of the rigid upper cylindrically shaped section;

d) a filtering vortex finder located in said upper cylindrically shaped section, said filtering vortex finder including an outer cylindrical casing having a casing wall and having first and second opposed ends, a generally cylindrical wave-shaped filter having first and second opposed ends and having a diameter smaller than a diameter of said outer cylindrical casing, said cylindrical wave-shaped filter being located inside, and concentric with, said outer cylindrical casing such that an annular chamber is located between said cylindrical wave-shaped filter and an inner surface of said casing wall, and a perforated annular gas distributor extending between said casing wall and a first circumferential end of said cylindrical wave-shaped filter at one end of said annular chamber, and a second end of said annular chamber in flow communication with said gas outlet, and a pipe having a first end in flow communication with said annular chamber through said perforated annular gas distributor; and e) an elongated shaft aligned longitudinally along the central axis of the cylindrical-conical body, and a rotary brush being connected coaxially to said elongated shaft, said rotary brush having a radial dimension such that peripheral radial edges of said rotary brush sweeps an inner surface of the wave-shaped filter, and including rotation means for rotating said elongated shaft.

In operation, a gas stream containing particles enters said tangential inlet and said gas stream spins downwards along an inner surface of the cyclone body forming an outer vortex in the upper cylindrically shaped section which accelerates as it spirals down into the lower conically shaped section, wherein large particles in said gas stream are separated from the outer vortex due to centrifugal force and fall into the dust hopper, and wherein the outer vortex including finer particles will travel down to the bottom of the cyclone body and make a turn and spin upwardly in the central area of the cyclone body and within the outer vortex wherein the upwardly spiraling gas stream containing the finer particles forms an inner vortex, and as the inner vortex rotates upwards, some of the finer particles are separated from the inner vortex and collected by the dust hopper, and wherein a remainder of the finer particles travel with said inner vortex and enter an interior of the filtering vortex finder where some of the finer particles are captured by the rotary brush, and when the inner vortex penetrates the wave-shaped filter, particles having a diameter larger than a preselected diameter will be stopped by the wave-shaped filter, and wherein a clean gas stream flows upwardly in the annular chamber and through the second end of the annular chamber into the gas outlet.

A further understanding of the functional and advantageous aspects of the invention can be realized by reference to the following detailed descriptions and drawings.

BRIEF DESCRIPTION OF THE DRAWINGS

The invention will be more fully understood from the following detailed descriptions thereof taken in connection with the accompanying drawings, which form a part of this application, and in which:

FIG. 2b is a cross sectional view of the inlet to the rotary gas cyclone separator located at the top of the cylindrical-conical housing of FIG. 2a.

FIG. 4c is a detailed view of the circled portion of FIG. 4a;and

DETAILED DESCRIPTION OF THE INVENTION

Figure 1:
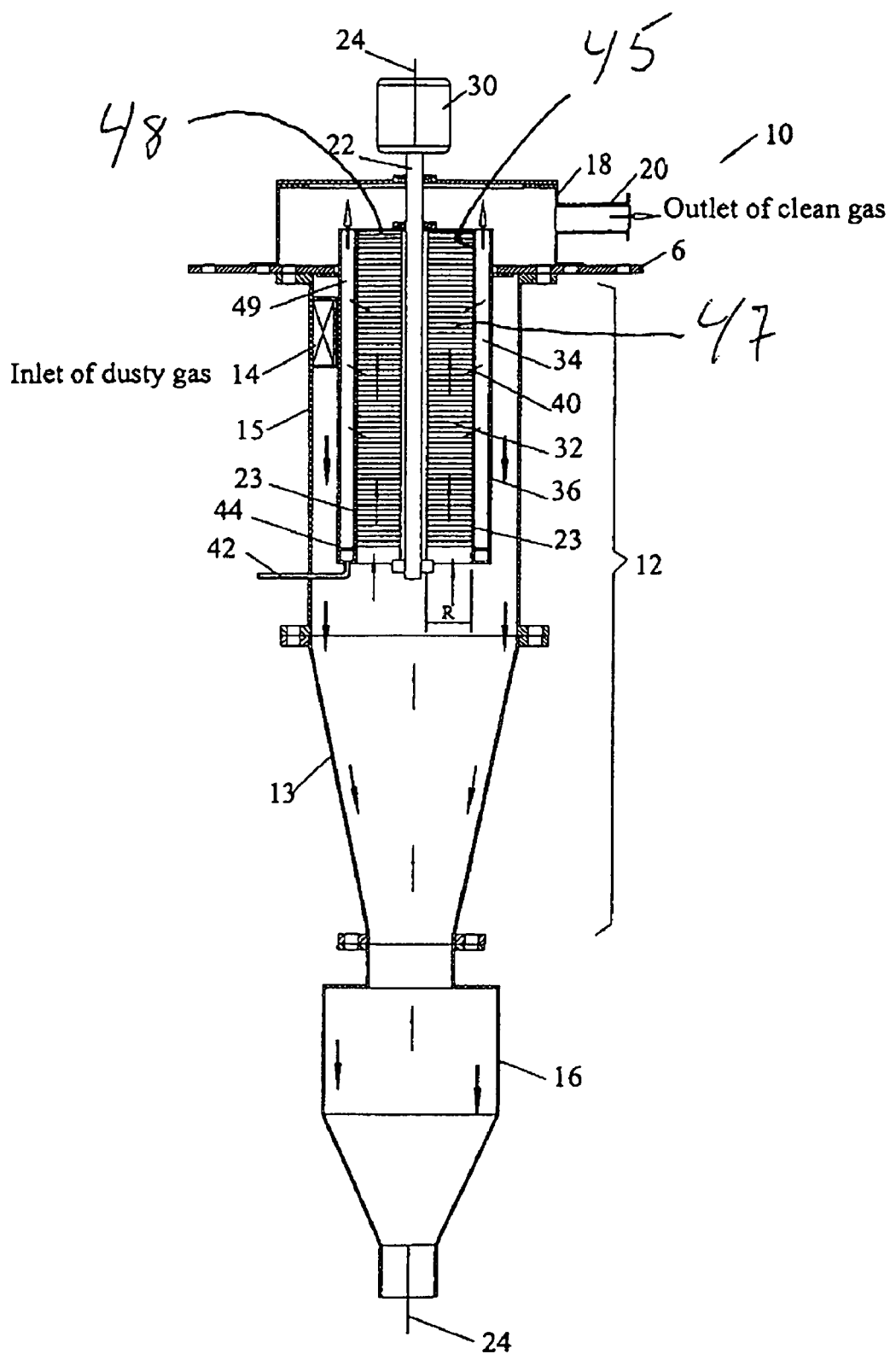
FIG. 1 is a cross sectional elevational view of a rotary gas cyclone separator constructed in accordance with the present invention.

The present invention provides a rotary gas cyclone separator for removing fine particulate material from air or other gas streams. Referring first to FIG. 1, a rotary gas cyclone separator constructed in accordance with the present invention is shown generally at 10 and includes a rigid cylindrical-conical type cyclone body 12 having a lower rigid conically shaped section 13 and an upper rigid cylindrically shaped section 15 with a tangential inlet 14, a dust hopper 16 placed below and attached to a bottom of the rigid lower section 13, a clean air casing 18 attached to the top of the upper rigid cyclone body section 15 of rigid cyclone body 12. Casing 18 includes an outlet duct 20, and a shaft 22, which is driven by a motor 30, and is aligned longitudinally along the central axis 24 of the cylindrical-conical body 12.

Figure 2A:
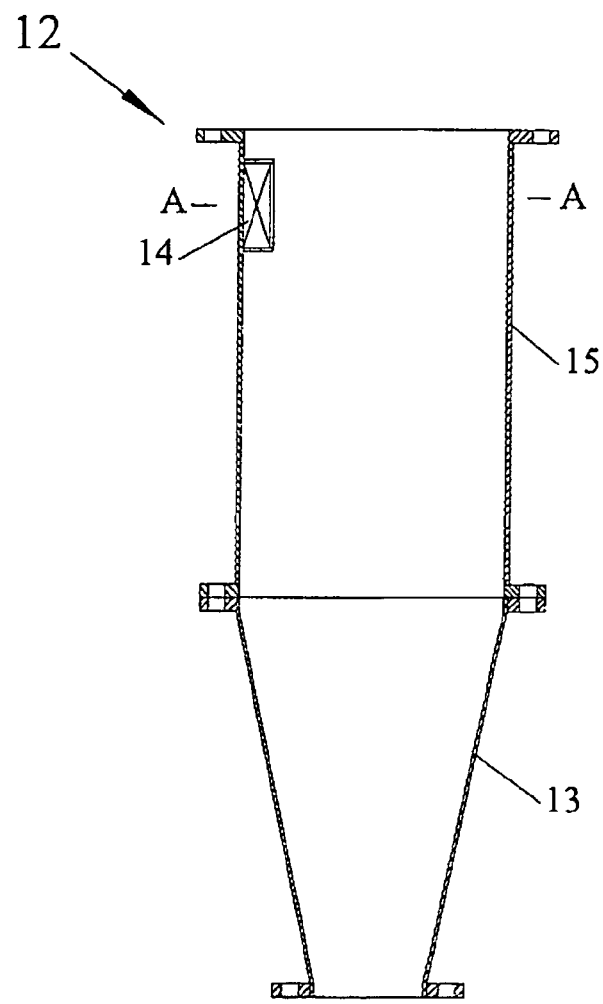
FIG. 2a is a cross sectional elevational view of a part of the cylindrical-conical housing of the rotary gas cyclone separator of FIG. 1.
Figure 2B:
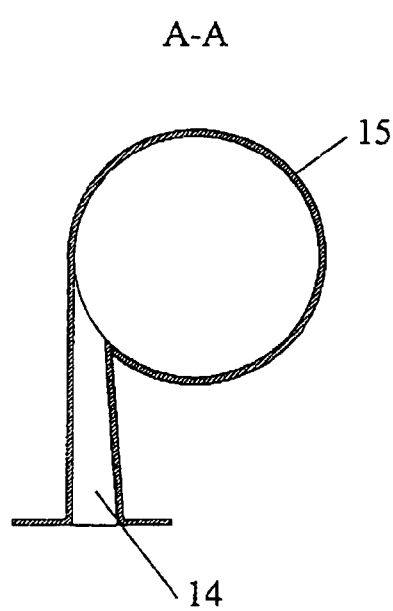
Figure 3:
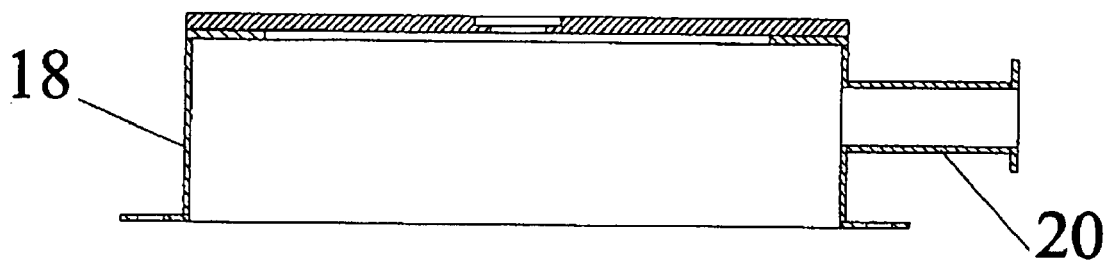
FIG. 3 is a cross sectional view of the air outlet casing located at the top of the rotary gas cyclone separator of FIG. 1.

The tangential inlet 14 allows dusty air to be introduced tangentially into the upper cylindrical section 15. The cyclone body 12 and the tangential inlet 14 are shown in FIGS. 2a and 2b. The purpose of dust hopper 16 is to collect the particles separated from the gas stream. The casing 18 in combination with outlet duct 20 is the outlet or exit path for the cleaned gas (which while normally air may be other gases depending on the process for which the cyclone is being used for). The detailed configuration is shown in FIG. 3.

Figure 4A:
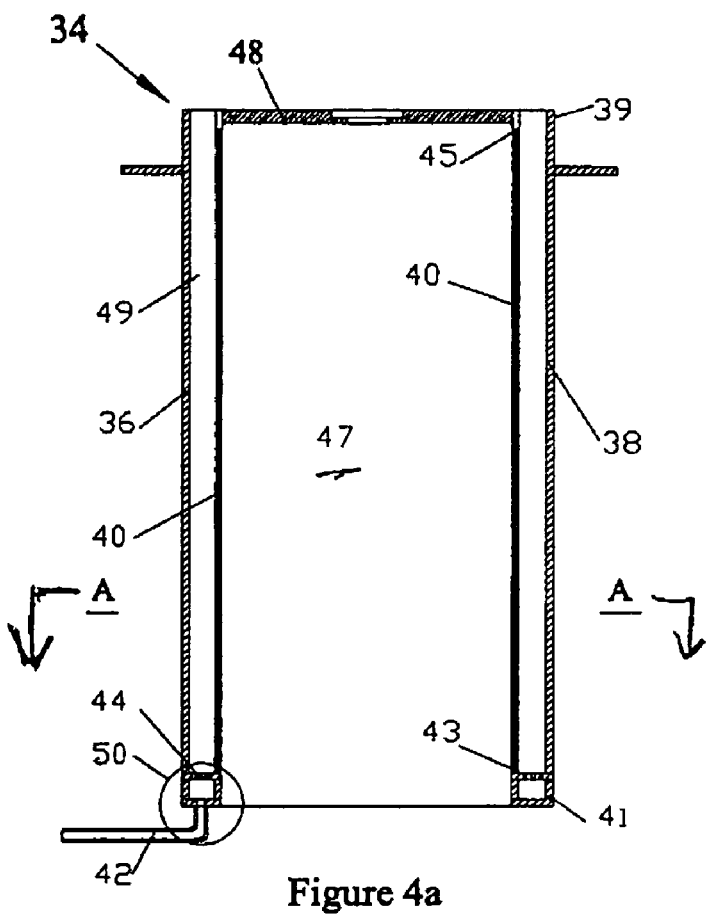
FIG. 4a is a cross sectional elevational view of a cylindrical casing which houses a ducted filtering vortex finder and filter located in the cylindrical-conical type cyclone body of FIG. 1.
Figure 4C:
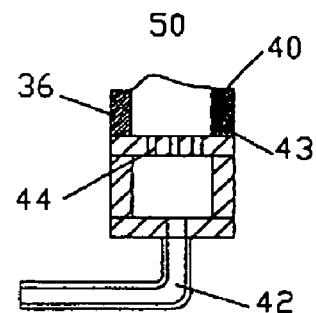
Figure 4B:
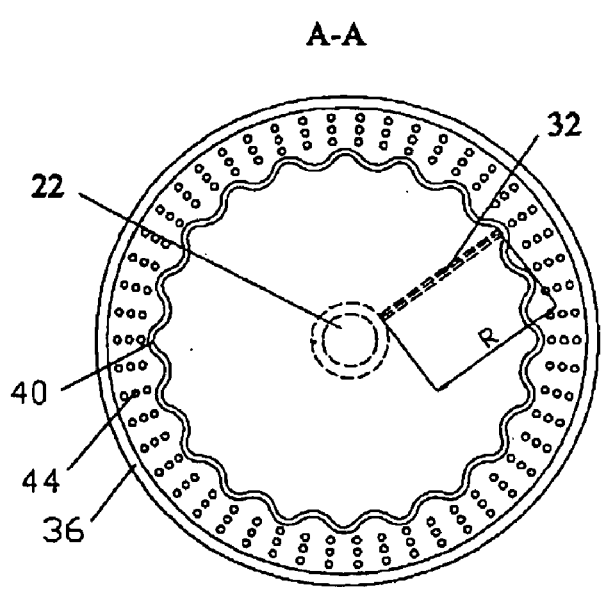
FIG. 4b is a view of the cylindrical casing with the ducted filtering vortex finder and filter of FIG. 4a taken along line A-A.

Referring to FIG. 1 and particularly FIGS. 4a, 4b and 4c, the dual-ducted filtering vortex finder 34 includes an outer cylindrical casing 36 having an inner casing wall 38 and having first and second opposed ends 39 and 41. The dual-ducted filtering vortex finder 34 includes a cylindrical wave-shaped filter 40 and an outer cylindrical casing 36. The cylindrical wave-shaped filter 40 has first and second opposed ends 43 and 45 and has a diameter smaller than the diameter of the outer cylindrical casing 36. The second end 45 of the cylindrical wave shaped filter 40 is sealed by a cover 48, which is also sealed with the shaft 22, see FIGS. 1 and 4a. The cylindrical wave-shaped filter 40 is located inside, and is generally concentric with the outer cylindrical casing 36 such that an annular chamber 49 is located between the cylindrical wave-shaped filter 40 and the inner casing wall 38. The cylindrical wave-shaped filter 40 encloses an interior volume 47. The top end of volume 47 is sealed by cover 48. A perforated annular gas distributor 44 extends between the inner casing wall 38 and the circumferential end 43 of the cylindrical wave-shaped filter 40 at the bottom of the annular chamber and the upper end of the annular chamber 49 opens into (is in flow communication with) casing 18 and outlet duct 20 through which the cleaned gas flows.

An aeration pipe 42 has a first end in flow communication with the annular chamber 49 through the perforated annular gas distributor 44. Preferably the wave-shaped filter 40 is generally the same length as the cylindrical casing 36 but this is not essential.

The wave-shaped filter 40 is made of porous material, whose pore sizes may range from about 1 to about 10 microns depending on the size of particles to be separated. A secondary clean air stream is introduced through the aeration pipe 42 into chamber 49 to blow out fine particles (smaller than the pore sizes) which enter into chamber 49 between the outer cylindrical casing 36 and the inner wave-shaped filter 40 to the casing 18. Finally, these particles leave the cyclone with clean gas through outlet 20.

The secondary air flow is to blow out the uncaptured particles so as to prevent the accumulation of these fine particles in chamber 49 of the apparatus. Accumulation of these much smaller particles in the chamber 49 may have a deleterious impact on the continuous operation of the rotary gas cyclone separator The secondary clean air is distributed by the perforated gas distributor 44 which includes a plurality of apertures with 1 mm diameter. The motor 30 drives the rotary brush 32 to rotate at various rotational speeds, ranging from 500 to 4000 rpm, which speed is controllable.

Referring again to FIG. 1, a rotary brush 32 is connected tightly coaxially to the shaft 22 and rotary brush 32 has at least a radial dimension R (FIG. 1) whose preferable length is as shown in FIG. 4b, such that the peripheral radial edges 23 of rotary brush 32 reach all the inner surface of the wave-shaped filter 40. The rotary brush 32 preferably has the same height as the wave-shaped filter 40.

In operation, the stream of dusty air (or other particle laden gas) is introduced to the rotary gas cyclone separator tangentially through the inlet 14. Then, the dusty gas spins downwardly along the inner surface of the cyclone body 12 along the direction of the darker, thicker arrows in FIG. 1, and the spiral gas flow is referred to as the outer vortex. The outer vortex is formed in the cylindrical section 15 and is accelerated in the conical section 13. A majority of relatively large particles are separated from the outer vortex due to the centrifugal force and fall into the dust hopper 16. Most of fine particles will travel with the outer vortex gas flow down to the bottom of the conical section 13 and make a turn and spin upwardly in the central area of the cyclone body and within the outer vortex (thin arrows in FIG. 1). The upwardly spiraling gas flow is referred to as the inner vortex and is inside the outer vortex flow. When the inner vortex rotates upwards, some of the finer powders will be separated from the inner vortex and drop down and be collected by the dust hopper 16. This is a first stage separation. The remainder of the finer particles will travel upwardly with inner vortex and enter the interior volume 47 of the wave-shaped filter 40, where some of the fine particles will be captured by the rotary brush 32. This is a second stage separation. When the gas stream penetrates the wave-shaped filter 40 into annular chamber 49 as illustrated by the arrows showing the gas penetrating the filter 40 from interior volume 47 all the fine particles larger than 1 micron will be stopped by the filter 40. This is a third stage separation. The clean gas stream will flow up through the annular chamber 49 and out of the upper end and into casing 18, in the direction of the two arrows exiting chamber 49, and leaves at the outlet duct 20. The fine particles stopped by the filter 40 will eventually fall into the dust hopper 16. The rotary brush 32 acts to prevent the accumulation of fine particles on the filter surface.

Figure 5:
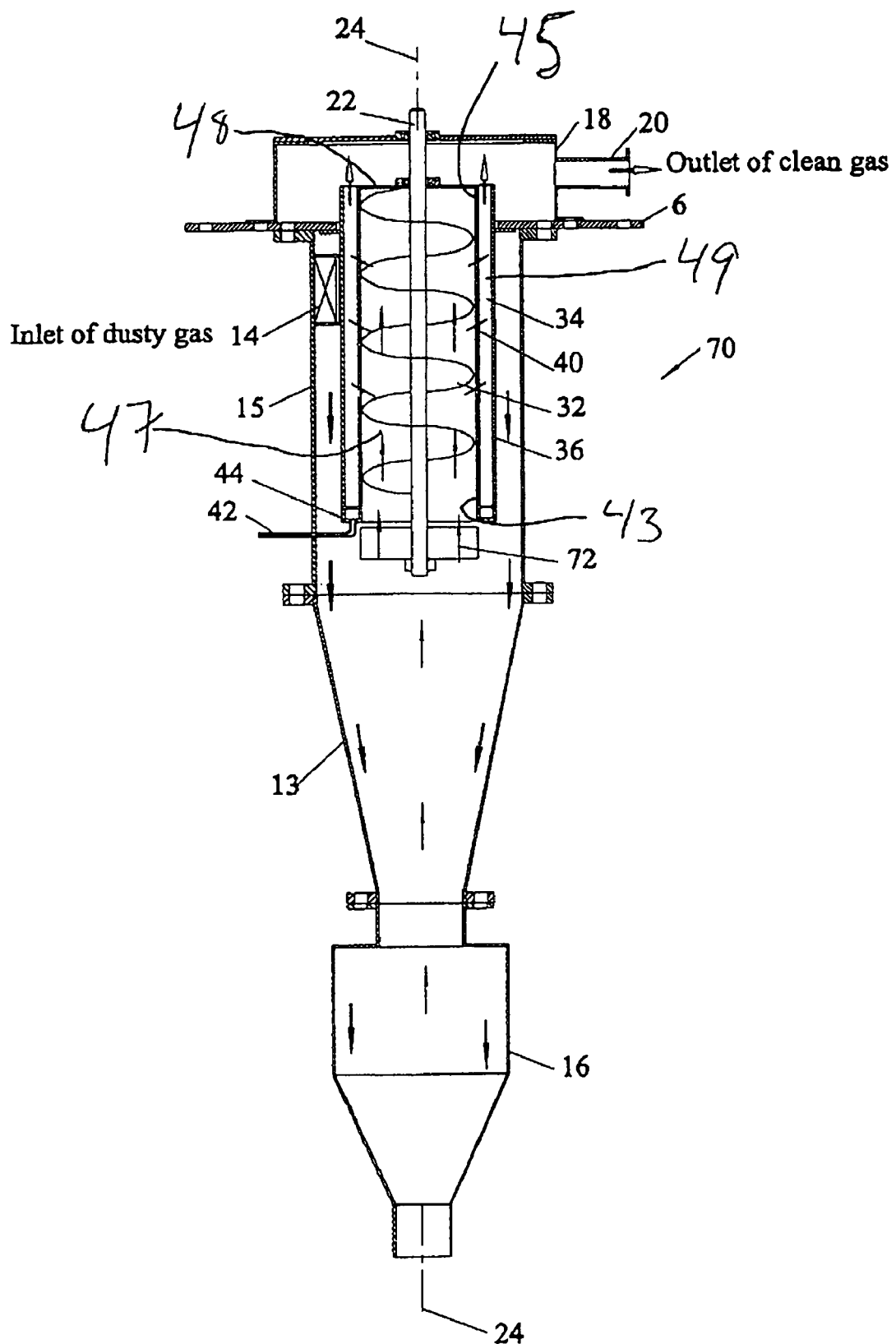
FIG. 5 is a cross sectional elevational view of an alternative embodiment of a rotary gas cyclone separator constructed in accordance with the present invention.

For those situations that are unsuitable for using a motor, an alternative embodiment of the rotary gas cyclone separator shown generally at 70 in FIG. 5 may be used. In this design, all the components are the same as for separator shown in FIG. 1 except there is no motor 30 but does further include a swirling vane 72 mounted at the bottom end of the shaft 22. The swirling gas flow provides the initial momentum to vane 72 when it flows into the dual-ducted filtering vortex finder 34. The swirling gas flow provides the additional force to drive the vane 72 and the rotary brush 32 to rotate. In this case, the rotary brush 32 can be spiral shaped in order to reduce the friction resistance of the brush 32 while the brush 32 still maintains its function to prevent fine particles from attaching to the inner surface of the filter 40.

Within the dual-ducted filtering vortex finder 34, the inner vortex spins upwards along the central axis 24 (thin arrows) and at the same time, it moves outwards towards the inner surface of the vortex finder 34 (short diagonal arrows shown in FIGS. 1 and 5). Referring particularly to FIG. 4b, the brush elements of brush 32 are long enough so that the peripheral radial edges of the rotary brush sweeps an entire inner surface of the inner radially wavey surface of the wave-shaped filter 40. The brush elements of brush 32 are arranged perpendicular to the central axis 24 and thus the brush elements are perpendicular to the upwardly moving inner vortex. Since the brush elements rotate at a high rotational speed, most of the fine particles carried by the inner vortex will be caught by the rotating brush elements due to impingement. The filter 40 is designed to be a wave-shaped cylinder (as shown in FIG. 4b), which has two advantages. Firstly, the wave-shaped filter 40 has a large filtration area, which is in favor of low pressure drop. Secondly, the wave-shaped filter 40 provides the vibration source for the rotary brush 32. The wave-shaped surface of the filter 40 induces the brush elements to vibrate when the rotary brush 32 rotates through. The vibration of the brush elements can shake off the fine particles attached to the brush elements and these fine particles eventually fall down and are collected by the dust hopper 16. It is inevitable that some tiny particles may follow the gas stream and penetrate the aperture of the filter 40 and fall down to the bottom of chamber 49 of the vortex finder 34 located between the inner layer of the filter 40 and outer layer of cylinder casing 36. To prevent these tiny particles accumulating in the chamber 49 air is introduced through the tube 42 and passes through the gas distributor 44 to blow these tiny particles out of the dual-ducted filtering vortex finder 34.

The self-rotational gas cyclone separator 70 shown in FIG. 5 is very advantageous in that it can be used within a reactor, such as fluid catalytic cracking units, or can be installed in an explosive environment since it does not include the motor 30.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A rotary cyclone apparatus for separating particles from a gas stream, comprising:
   a) a cylindrical-conical type cyclone body having a rigid lower conically shaped section and a rigid upper cylindrically shaped section with a tangential inlet, said cylindrical-conical type cyclone body including a central axis;
   b) a dust hopper attached to a bottom of the rigid lower conically shaped section;
   c) a gas outlet attached to a top of the rigid upper cylindrically shaped section;
   d) a filtering vortex finder located in said upper cylindrically shaped section, said filtering vortex finder including an outer cylindrical casing having a casing wall and having first and second opposed ends, a generally cylindrical wave-shaped filter having first and second opposed ends and having a diameter smaller than a diameter of said outer cylindrical casing, said cylindrical wave-shaped filter being located inside, and concentric with, said outer cylindrical casing such that an annular chamber is located between said cylindrical wave-shaped filter and an inner surface of said casing wall, and a perforated annular gas distributor extending between said casing wall and a circumference of said first opposed end of said cylindrical wave-shaped filter at one end of said annular chamber, and a second end of said annular chamber in flow communication with said gas outlet, and a pipe having a first end in flow communication with said annular chamber through said perforated annular gas distributor; and
   e) an elongated shaft extending into said cylindrical wave-shaped filter through said second opposed and being aligned longitudinally along a central axis of the cylindrical wave-shaped filter, which is coincident with said central axis of the cylindrical-conical body, and a rotary brush being connected coaxially to said elongated shaft, said second opposed end of said cylindrical wave-shaped filter, including a sealing member for sealing said second opposed end of said cylindrical wave-shaped filter between said elongated shaft and a circumference of said second opposed end, said rotary brush having a radial dimension such that peripheral radial edges of said rotary brush sweeps an inner surface of the wave-shaped filter when the elongated shaft is rotated, and including rotation means for rotating said elongated shaft.

2. The rotary cyclone apparatus according to claim 1 wherein said wave-shaped filter is made of porous material with pore sizes range from about 1 to about 10 microns.

3. The rotary cyclone apparatus according to claim 1 including a vane mounted at a bottom end of the shaft, and wherein said rotation means for rotating said elongated shaft includes said swirling gas flow in the outer vortex providing a rotational drive to said vane.

4. The rotary cyclone apparatus according to claim 1 wherein said rotation means for rotating said elongated shaft includes a motor connected to said shaft for rotating said shaft about said axis.

5. The rotary cyclone apparatus according to claim 1 wherein said rotary brush has substantially the same height as said cylindrical wave-shaped filter.

6. The rotary cyclone apparatus according to claim 1 wherein said rotary brush has a sufficiently large radial dimension such that peripheral radial edges of said rotary brush sweeps an entire inner surface of an inner radially wavey surface of the wave-shaped filter.

7. The rotary cyclone apparatus according to claim 1 wherein said cylindrical wave-shaped filter has substantially the same height as said outer cylindrical casing.

8. The rotary cyclone apparatus according to claim 7 wherein said rotary brush has substantially the same height as said cylindrical wave-shaped filter.

9. The rotary cyclone apparatus according to claim 2 wherein said rotation means for rotating said elongated shaft includes a motor connected to said shaft for rotating said shaft about said axis.

10. The rotary cyclone apparatus according to claim 9 wherein said rotary brush has substantially the same height as said cylindrical wave-shaped filter.

11. The rotary cyclone apparatus according to claim 10 wherein said rotary brush has a sufficiently large radial dimension such that peripheral radial edges of said rotary brush sweeps an entire inner surface of an inner radially wavey surface of the wave-shaped filter.

12. The rotary cyclone apparatus according to claim 11 wherein said cylindrical wave-shaped filter has substantially the same height as said outer cylindrical casing.

13. The rotary cyclone apparatus according to claim 12 wherein said rotary brush has substantially the same height as said cylindrical wave-shaped filter.

14. The rotary cyclone apparatus according to claim 3 wherein said rotary brush has substantially the same height as said cylindrical wave-shaped filter.

15. The rotary cyclone apparatus according to claim 14 wherein said rotary brush has a sufficiently large radial dimension such that peripheral radial edges of said rotary brush sweeps an entire inner surface of an inner radially wavey surface of the wave-shaped filter.

16. The rotary cyclone apparatus according to claim 15 wherein said cylindrical wave-shaped filter has substantially the same height as said outer cylindrical casing.

17. The rotary cyclone apparatus according to claim 16 wherein said rotary brush has substantially the same height as said cylindrical wave-shaped filter.

18. The rotary cyclone apparatus according to claim 1 wherein said wave-shaped filter is made of porous material with pore sizes range from about 1 to about 10 microns, and wherein said rotation means for rotating said elongated shaft includes a motor connected to said shaft for rotating said shaft about said axis, and wherein said rotary brush has substantially the same height as said cylindrical wave-shaped filter, and wherein said rotary brush has a sufficiently large radial dimension such that peripheral radial edges of said rotary brush sweeps an entire inner surface of an inner radially wavey surface of the wave-shaped filter, and wherein said cylindrical wave-shaped filter has substantially the same height as said outer cylindrical casing.

19. The rotary cyclone apparatus according to claim 1 wherein said wave-shaped filter is made of porous material with pore sizes range from about 1 to about 10 microns, and including a vane mounted at a bottom end of the shaft, and wherein said rotation means for rotating said elongated shaft includes said swirling gas flow in the outer vortex providing a rotational drive to said vane, and wherein said rotary brush has substantially the same height as said cylindrical wave-shaped filter, and wherein said rotary brush has a sufficiently large radial dimension such that peripheral radial edges of said rotary brush sweeps an entire inner surface of an inner radially wavey surface of the wave-shaped filter, and wherein said cylindrical wave-shaped filter has substantially the same height as said outer cylindrical casing.

\* \* \* \* \*